Aug. 19, 1952     O. A. SUTTON     2,607,819
ELECTRIC MOTOR SUPPORT
Filed Oct. 20, 1950     2 SHEETS—SHEET 1
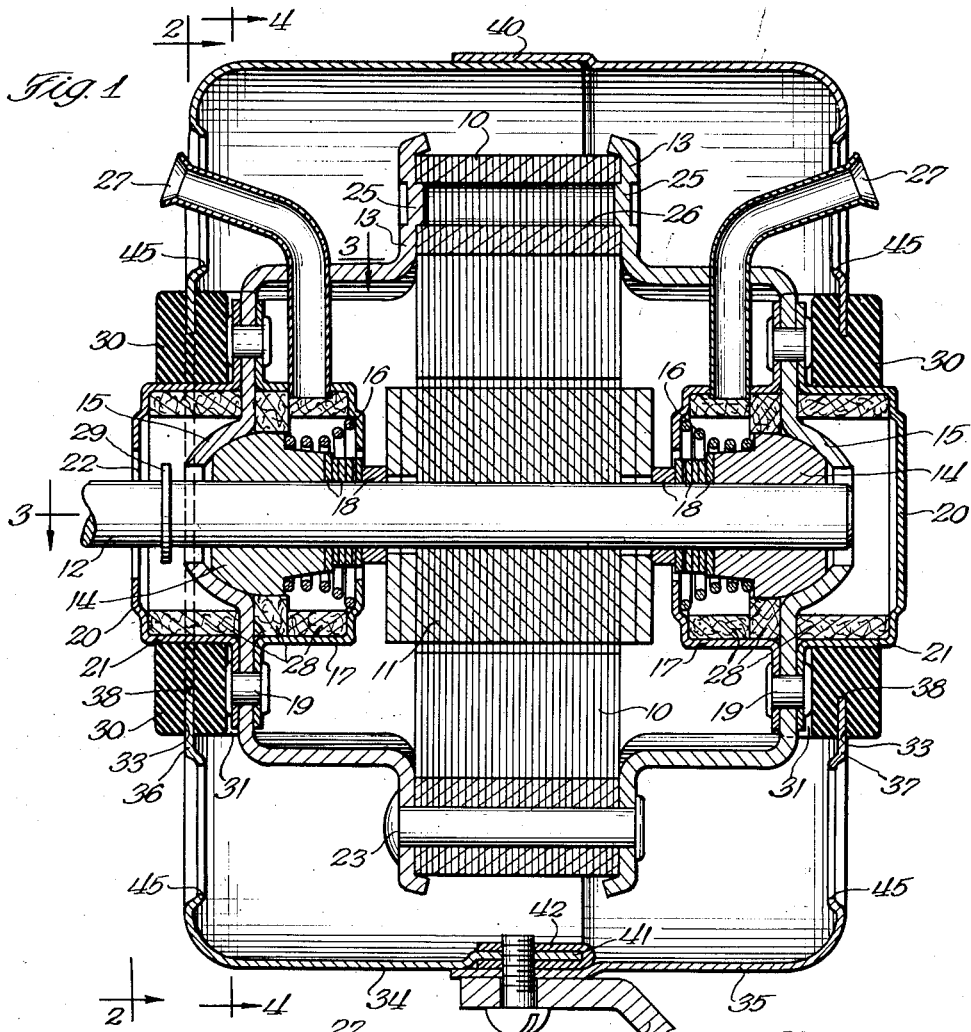
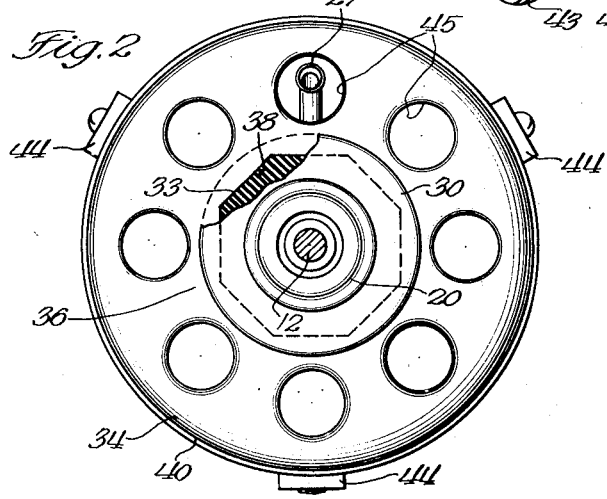
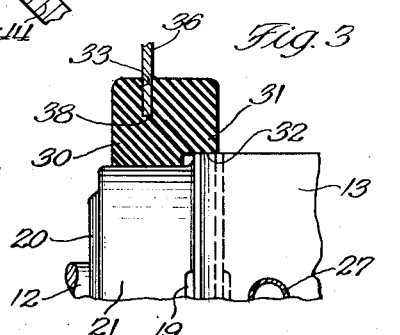
INVENTOR.
Ottis A. Sutton
BY
Buckhorn and Cheatham
ATTORNEYS Aug. 19, 1952   O. A. SUTTON   2,607,819
ELECTRIC MOTOR SUPPORT
Filed Oct. 20, 1950   2 SHEETS—SHEET 2
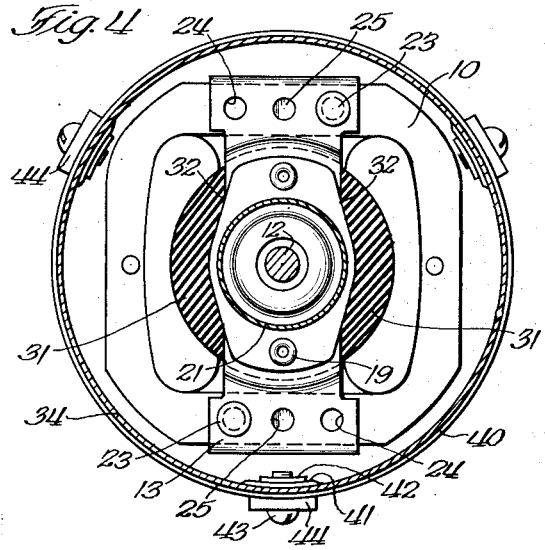
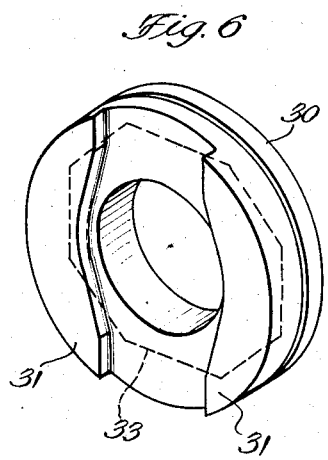
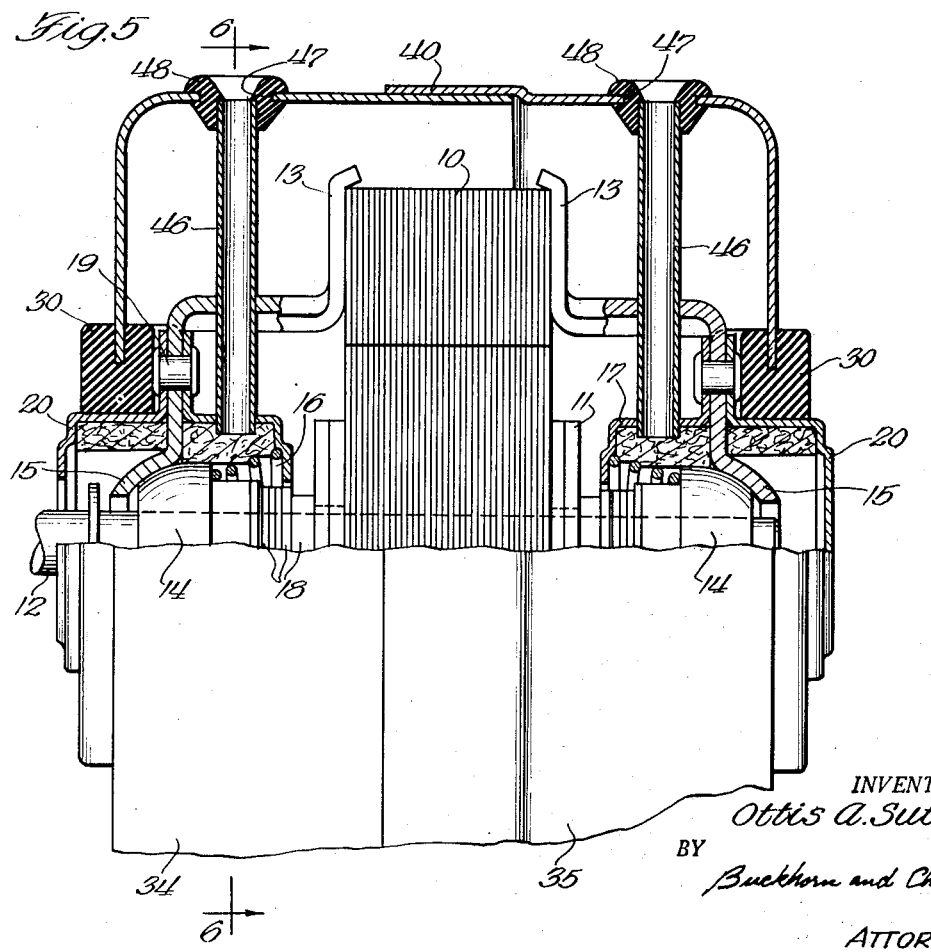
INVENTOR.
Ottis A. Sutton
BY
Buckhorn and Cheatham
ATTORNEYS Patented Aug. 19, 1952

2,607,819

UNITED STATES PATENT OFFICE 2,607,819

ELECTRIC MOTOR SUPPORT

Ottis A. Sutton, Wichita, Kans., assignor to The
O. A. Sutton Corporation, Inc., Wichita, Kans.,
a corporation of Kansas Application October 20, 1950, Serial No. 191,206

6 Claims. (Cl. 172—36)

The present invention relates to an electric motor, the principal object of the present invention being to provide a quiet, vibrationless motor. Suggested uses for the motor include electric fans, vacuum cleaners, and other devices where quiet, vibrationless operation is highly desirable.

An object of the present invention is to provide a relatively simple construction of the foregoing character which may be easily assembled and which comprises relatively few parts which are relatively easily manufactured.

The present invention comprises an assembly in which a resilient cushion ring is incorporated, the cushion ring holding a motor housing in its assembled relation to the stator, and which comprises means for permitting relative rotation of the housing with respect to the stator whereby the relative position of the stator with respect to an appliance may be altered. It is well known that in some appliances the normal position of the oil conducting tubes above the rotor centerline may not be employed because access could not be had thereto. The present invention is designed to permit the oil tubes to be arranged in any of a plurality of alternate positions.

The objects and advantages of the present invention may be more readily ascertained by inspection of the following specification taken in connection with the accompanying drawing wherein like numerals refer to like parts throughout, while the features of novelty will be more distinctly pointed out in the appended claims.

In the drawing,

Fig. 1 is a longitudinal section through an electric motor embodying the present invention;

Fig. 2 is an end view, with a portion partially broken away, illustrating the present invention;

Fig. 3 is a partial section, on an enlarged scale, taken substantially along line 3—3 of Fig. 1;

Fig. 4 is a vertical section taken substantially along line 4—4 of Fig. 1;

Fig. 5 is a partial vertical section through a modified form of motor embodying the present invention; and Fig. 6 is a perspective view of the resilient cushion ring incorporated in the present invention.

The motor illustrated in Figs. 1 to 4 inclusive comprises a stator 10 of any desired character, which concentrically surrounds a rotor including the armature 11 and shaft 12 which may project from either or both ends of the motor as desired. The rotor is maintained in concentric relation to the stator by a pair of supporting assemblies including end brackets 13 which are fixed to the stator 10 and bearings 14 which journal the rotor. The end brackets 13 preferably comprise semispherical portions 15 which provide seats for semispherical ends of the bearings 14, thereby providing self-adjusting bearing means for maintaining the rotor in proper relationship to the stator. The bearings 14 are provided with inwardly protruding reduced portions terminating in vertical surfaces for seating the outer ends of springs 16, the opposite ends of which are seated against spring retainer cups 17 which form portions of the supporting assemblies. The inner ends of the bearings 14 engage the outermost ones of sets of washers 18 which may vary in thickness and number according to the necessity therefor determined as the motor is being assembled. The end brackets 13 are affixed to the bearing spring retainer cups 17 by a plurality of rivets 19, which rivets also retain outwardly protruding cup-shaped members 20 having cylindrical walls 21. In a single-ended shaft as illustrated the end wall of one member 20 would be solid whereas the other would have a shaft opening 22 therein, but it is to be appreciated that both members would be provided with shaft openings for a double-ended shaft. The end brackets 13 are preferably made alike so that each is provided with an opening for passage of the shaft 12. The stator 10 is preferably provided with a set of three openings at both top and bottom, one of the openings providing means for reception of a stator rivet 23. The stator rivets 23 are located on opposite sides of the vertical centerlines of the end brackets but in diametrically opposed relationship to each other. In order to permit the use of an identical pair of end brackets 13 the opposite side openings 24 are provided, these openings being capable of holding another pair of stator rivets, such not being necessary in the usual small electric motor. The end brackets are provided with coined lugs 25 along the vertical centerline thereof which are received in the central openings 26 of the three opposed pairs of openings in the stator 10, thus providing means accurately to fix the end bracket assemblies with relation to the stator 10. An oil tube 27 projects through the end bracket 13 into the interior of the spring retainer cup 17. A plurality of felt washers 28 are preferably provided inside of the spring retainer cups 17 and the end cups 20 in order to hold oil in contact with the bearing member 14 and to retain any oil which may be slung from the shaft 12. An oil slinger flange 29 is preferably provided on the portion of shaft 12 which projects through the opening 22 in order to prevent oil from escaping from the interior of the motor. It will be apparent from the foregoing that the assembly as so far described comprises a stator, a rotor maintained in concentric relation to the stator by means of common supporting assemblies affixed to the ends of the stator and including bearing means for journaling the rotor, the supporting assemblies each including a longitudinal protruding cylindrical portion 21.

In order to mount the motor in its position of use and, where desired, to provide an enclosing housing for the motor, means are mounted upon the protruding cylindrical portions 21 comprising a pair of cushion rings 30 of resilient material such as artificial rubber or the like. The rings are snugly mounted upon the cylindrical portions and each ring comprises a pair of longitudinally projecting, nonconcentric flanges 31 which extend longitudinally in overlapping relation with a pair of nonconcentric, laterally disposed surfaces 32 on the mounting assembly in order to prevent relative rotation of the cushion ring with respect to the stator 10. Each cushion ring is provided with a peripheral slot 33 circumscribing the cushion ring, the bottom of which defines a regular polygon, preferably a regular octagon. The diameter of the largest circle which may be inscribed within the bottom of slot 33 is substantially greater than the outer diameter of the cylindrical wall portion 21. The form of motor housing or mounting means herein illustrated comprises a pair of cup-shaped housing members 34 and 35 including end walls 36 and 37 respectively. In each end wall there is a central opening 38 of larger minimum size than the diameter of the member 21, the same defining a regular polygon matching the bottom of the slot 33. The end wall is seated in the slot 33 of the cushion ring with the surface thereof in engagement with the bottom of the slot 33 throughout. The cushion ring 30 is of material sufficiently resilient to permit deformation thereof when the cushion ring is separated from the cylindrical member 21 to the extent that the cushion ring may be rotated to any one of a plurality of selectable positions relative to the housing member.

The rim of the cup-shaped member 34 is embraced within the outwardly flanged rim 40 of the cup-shaped member 35 in order that the two members may be slipped together to provide the complete housing. The rim of the member 34 is provided with a plurality of inwardly projecting, displaced portions 41 for reception of a plurality of clip-nuts 42. Each of the clip-nuts provides means for retaining a screw 43 which passes through an opening in the end of a mounting arm 44 extending to the frame of the appliance or to other supporting structure.

Each of the cup-shaped housing members has a plurality of regularly spaced apertures 45 in its end wall, through a selected pair of which the longitudinally bent ends of the oil tubes 27 may project. It will be apparent that by relatively rotating the cushion rings 30 prior to assembling the same upon the projecting portions 21, the relative positions of the oil tubes 27 may be varied to suit the particular circumstances. It will also be apparent that, instead of mounting arms 44 as illustraetd, one or the other, or both, of the housing members 34 and 35 may have affixed thereto brackets or the like upon which the motor is mounted, the construction of the cushion rings 30 permitting the same selective positioning of the oil tubes with respect to the supporting structure.

Fig. 5 illustrates a modified form of oil tube 46 extending radially outward into proximity with an aperture 47 in the longitudinal surface of the housing member, the outer end of the tube being held in proper relation to the aperture by a resilient grommet 48. In all other respects this modification may be the same as the previously described modification.

It is to be appreciated that the housing members 34 and 35 comprise motor mounting means maintained in spaced relation to the vibration producing rotor and stator through the medium of the cushion rings 30. The motor mounting means could comprise an open framework only partially enclosing the motor, the only necessary portions thereof being the end walls mounted upon the cushion rings 30, and any means for connecting the end walls together and for attaching the motor to an appliance.

Having illustrated and described preferred embodiments of the present invention, it will be apparent to those skilled in the art that the invention permits of modification in arrangement and detail. I claim as my invention all such modifications as come within the true spirit and scope of the appended claims.

I claim:

1. An electric motor comprising a stator, a rotor mounted in concentric relation to said stator, a common supporting assembly for the rotor and stator fixed to said stator and journaling said rotor, said assembly including a cylindrical portion projecting longitudinally in concentric relation to the rotor and stator, a cushion ring of resilient material snugly surrounding and engaging said cylindrical portion, said cushion ring comprising a plurality of nonconcentric longitudinally projecting flanges and said assembly having nonconcentric surfaces in engagement with said flanges to prevent relative rotation of said cushion ring and said stator, and a motor mounting structure comprising an end wall surrounding said cushion ring, said cushion ring having an external surface of regular, polygonal outline arranged in concentric relation to said rotor and stator, and said end wall having a polygonal opening therethrough, the polygonal edge of said opening being in contact throughout with said polygonal surface of said cushion ring, said cushion ring being deformable and separable from said cylindrical portion and from said end wall whereby relative rotation of said cushion ring and said end wall to a plurality of positions of engagement of said polygonal edge throughout with said polygonal surface may be effected.

2. An electric motor comprising a rotor, a stator, a pair of supporting structures journaling said rotor and respectively affixed to the opposite ends of said stator, said supporting structures each including a longitudinally protruding, cylindrical portion in concentric relation to said rotor and stator, a cushion ring of resilient material snugly surrounding and engaging each of said cylindical portions, each of said supporting structures having a pair of nonconcentric, laterally disposed surfaces adjacent said cylindrical portion and each of said cushion rings having a pair of longitudinally projecting flanges embracing the associated supporting structure in contact with said laterally disposed surfaces, and a motor housing including end walls, said end walls each having a regular, polygonal opening therethrough through which said cylindrical portions protrude, said openings being concentric to said rotor and stator and of larger minimum diameter than the external diameter of said cylindrical portions, and said cushion rings having external surfaces defining concentric polygonal surfaces in matching engagement throughout with the polygonal edges of said openings, said cushion rings being deformable and separable from said cylindrical portions and from said end walls whereby relative rotation of said cushion rings and said end walls to selected positions of matching engagement of said polygonal surfaces with said polygonal edges may be effected.

3. An electric motor comprising a rotor, a stator, a pair of supporting structures journaling said rotor and respectively affixed to the opposite ends of said stator, said supporting structures each including an outwardly protruding, cylindrical portion in concentric relation to said rotor and stator, a cushion ring of resilient material snugly surrounding and engaging each of said cylindrical portions, each of said supporting structures having a pair of nonconcentric, laterally disposed surfaces adjacent said cylindrical portion and each of said cushion rings having a pair of longitudinally directed flanges engaging said laterally disposed surfaces, a motor housing including end walls, said end walls each having a regular, polygonal opening therethrough through which said cylindrical portions protrude, said openings being concentric to said rotor and stator and of larger minimum diameter than the external diameter of said cylindrical portions, said cushion rings being of greater maximum diameter than the maximum diameter of said openings, and said cushion rings each having a peripheral slot therein into which the adjacent end wall extends, the bottoms of said slots defining regular polygons in contact with the polygonal edges of said openings in said end walls throughout their extents, said cushion rings being deformable and separable from said cylindrical portions and from said end walls whereby relative rotation of said cushion rings and said end walls to selected positions of matching engagement of said polygonal edges with the bottoms of said slots may be effected.

4. An electric motor comprising a rotor, a stator, means to journal said rotor in concentric relation to said stator comprising a supporting assembly fixed to said stator and including a bearing journaling said rotor, said supporting assembly including an outwardly protruding portion in concentric relation to said rotor and stator, a resilient cushion ring snugly embracing and engaging said protruding portion, said cushion ring and said assembly having nonconcentric surfaces in overlapping relation to prevent relative rotation of said cushion ring with respect to said stator, and a motor support including an end wall having an opening therethrough, said cushion ring having a peripheral slot therein, the bottom of said slot defining a regular polygon concentric with said rotor and stator, said opening being in the shape of a regular polygon matching the bottom of said slot, and said end wall being mounted on said cushion ring with the edge of said opening engaging the bottom of said slot throughout, said cushion ring being deformable and separable from said protruding portion and from said end wall whereby relative rotation of said cushion to selected positions of matching engagement of said polygonal opening and said slot may be effected.

5. An electric motor comprising a rotor, a stator, means to mount said rotor in concentric relation to said stator comprising an opposed pair of supporting assemblies each fixed to an end of said stator, each of said assemblies including a bearing journaling an end of said rotor, each of said assemblies including a longitudinally protruding portion in concentric relation to said rotor and stator, a cushion ring of resilient material snugly surrounding and engaging each of said protruding portions, said cushion rings and said assemblies having nonconcentric portions in longitudinally overlaping relation to prevent rotation of said cushion rings with respect to said stator, and a housing for said motor comprising a pair of opposed cup-shaped members each having an opening through the end wall thereof, said cushion rings each having a peripheral slot therein, the bottom of said slot defining a regular polygon concentric with said rotor and stator, said openings being in the shape of regular polygons of the same size and shape as the bottoms of said slots, said cup-shaped members being mounted on said cushion rings with the edges of said openings engaging the bottoms of said slots in matching relation thereto, said cushion rings being deformable and separable from said protruding portions and from said end walls whereby the nonconcentric portions of said cushion rings may be shifted to various positions with respect to said end walls, and the rims of said cup-shaped members being secured to each other to provide the complete motor housing.

6. An electric motor comprising a rotor, a stator, means to mount said rotor in concentric relation to said stator comprising an opposed pair of supporting assemblies each fixed to an end of said stator, each of said assemblies including a bearing journaling an end of said rotor, each of said assemblies including a longitudinally protruding portion in concentric relation to said rotor and stator, a cushion ring of resilient material sungly surrounding and engaging each of said protruding portions, said cushion rings and said assemblies having nonconcentric portions in overlapping relation to prevent rotation of said cushion rings with respect to said stator, a housing for said motor comprising a pair of opposed, cup-shaped members each having an opening through the end wall thereof, said cushion rings each having a peripheral slot therein, the bottom of said slot defining a regular polygon concentric with said rotor and stator, said openings being in the shape of regular polygons of the same size and shape as the bottoms of said slots, said cup-shaped members being mounted on said cushion rings with the edges of said openings engaging the bottoms of said slots in matching relation thereto, the rims of said cup-shaped members being secured to each other to provide the complete motor housing, each of said cup-shaped members having a plurality of apertures therethrough, said apertures being arranged in regular fashion adjacent the sides of said polygonal opening, and an oil tube mounted upon each of said supporting assemblies in position to conduct oil to said bearings and extending into proximity with one of said apertures, said cushion rings being deformable and separable from said protruding portions and from said end walls whereby the nonconcentric portions of said cushion rings may be shifted to various positions with respect to said end walls in order to bring selected apertures in said end walls into proximity with said oil tubes.

OTTIS A. SUTTON.

REFERENCES CITED

The following references are of record in the file of this patent:

UNITED STATES PATENTS

| Number | Name | Date |
| --- | --- | --- |
| 2,074,136 | Welch | Mar. 16, 1937 |
| 2,136,301 | Hoddy et al. | Nov. 8, 1938 |
| 2,221,745 | Kirby | Nov. 12, 1940 |
| 2,349,215 | Wahlborg | May 16, 1944 |
| 2,523,520 | Reinhard | Sept. 26, 1950 |